United States Patent
Subbiah et al.

(10) Patent No.: US 11,671,381 B2
(45) Date of Patent: Jun. 6, 2023

(54) VIRTUAL SWITCH FABRICS IN CONVERGED NETWORKS

(71) Applicant: DELL PRODUCTS L.P., Round Rock, TX (US)

(72) Inventors: Ramesh Kumar Subbiah, Chennai (IN); Vibin Varghese, Chennai (IN)

(73) Assignee: Dell Products L.P., Round Rock, TX (US)

( * ) Notice: Subject to any disclaimer, the term of this patent is extended or adjusted under 35 U.S.C. 154(b) by 273 days.

(21) Appl. No.: 17/170,084

(22) Filed: Feb. 8, 2021

(65) Prior Publication Data

US 2021/0184992 A1    Jun. 17, 2021

Related U.S. Application Data

(63) Continuation of application No. 16/254,252, filed on Jan. 22, 2019, now Pat. No. 10,958,596.

(51) Int. Cl.
| | |
|---|---|
| *H04L 49/00* | (2022.01) |
| *H04L 49/25* | (2022.01) |
| *H04L 12/10* | (2006.01) |
| *H04L 61/2592* | (2022.01) |
| *H04B 10/25* | (2013.01) |
| *H04L 12/46* | (2006.01) |

(52) U.S. Cl.
CPC ............. *H04L 49/70* (2013.01); *H04B 10/25* (2013.01); *H04L 12/10* (2013.01); *H04L 12/4633* (2013.01); *H04L 49/25* (2013.01); *H04L 61/2592* (2013.01)

(58) Field of Classification Search
CPC ..... H04L 49/70; H04L 12/10; H04L 12/4633; H04L 49/25; H04L 61/2592; H04L 2101/645; H04Q 2213/1302; H04Q 2213/1304; H04Q 2213/13399; H04Q 11/04; H04B 10/25
USPC ................................ 370/401, 428, 392, 389
See application file for complete search history.

(56) References Cited

U.S. PATENT DOCUMENTS

| | | | |
|---|---|---|---|
| 7,877,512 B2 | 1/2011 | Shanbhag et al. | |
| 8,151,318 B1* | 4/2012 | DeSanti | H04L 49/357 709/224 |
| 8,498,213 B2 | 7/2013 | Gnanasekaran et al. | |
| 8,831,013 B2 | 9/2014 | Gnanasekaran et al. | |
| 9,942,144 B1 | 4/2018 | Ramalingam et al. | |
| 2003/0012204 A1 | 1/2003 | Czeiger et al. | |
| 2005/0018673 A1* | 1/2005 | Dropps | H04L 49/357 370/389 |

(Continued)

OTHER PUBLICATIONS

"Fibre Channel, Switch Fabric (FC-SW) Rev 3.0," X3 working draft proposed, American National Standard, Published by the American National Standards Institute, New York, NY. Feb. 3, 1997. pp. 1-74.

(Continued)

*Primary Examiner* — Kwang B Yao
*Assistant Examiner* — Syed M Bokhari
(74) *Attorney, Agent, or Firm* — Joseph Mencher (57) ABSTRACT

A Fibre Channel over Ethernet (FCoE) network can be inexpensively extended by additional switches (220x) that do not have a full FCoE functionality, e.g. do not have full E-port functionality. The additional switches may or may not have unique Domain IDs. A virtual switch fabric can be extended by such additional switches.

20 Claims, 4 Drawing Sheets

(56) References Cited

U.S. PATENT DOCUMENTS

| | | | |
|---|---|---|---|
| 2006/0034302 A1* | 2/2006 | Peterson | H04L 49/357 370/401 |
| 2011/0064086 A1* | 3/2011 | Xiong | H04L 49/351 370/401 |
| 2011/0238816 A1 | 9/2011 | Vohra et al. | |
| 2011/0255540 A1* | 10/2011 | Mizrahi | H04L 45/74591 370/392 |
| 2012/0155469 A1 | 6/2012 | Majumdar et al. | |
| 2012/0177039 A1* | 7/2012 | Berman | H04L 41/12 370/428 |
| 2014/0269745 A1* | 9/2014 | Johnson | H04L 49/10 370/401 |
| 2015/0195178 A1 | 7/2015 | Bhattacharya et al. | |
| 2018/0343197 A1* | 11/2018 | Obulisami | H04L 61/5038 |

OTHER PUBLICATIONS

OS10 Enterprise Edition User Guide, "Dell EMC Networking FCoE-to-Fibre Channel Deployment with S4148U-ON in F_port Mode," Dell EMC Networking Infrastructure Solutions, Dell, Inc. Jun. 2018. pp. 1-975.

Mark Lippit et al., "Network Storage Concepts and Protocols. Designing a SAN. FC SAN Concepts. IP SAN Concepts," Version 3.0. EMC 2 Techbooks. Published by EMC Corporation. 2014. pp. 1-370.

Mark Lippit et al., "Fibre Channel Over Ethernet (FCoE) Data Center Bridging (DCB) Concepts and Protocols." Published by EMC 2 Version 15. 2015. pp. 1-314.

Dell EMC, "Dell EMC Networking FCoE-to-Fibre Channel Deployment with S4148U-ON in F_port Mode," Dell EMC Networking Infrastructure Solutions, Dell, Inc. Jun. 2018. pp. 1-61.

* cited by examiner

VIRTUAL SWITCH FABRICS IN CONVERGED NETWORKS

CROSS REFERENCE TO RELATED APPLICATIONS

The present is a continuation of U.S. patent application Ser. No. 16/254,252, filed Jan. 22, 2019, incorporated herein by reference.

BACKGROUND

The present disclosure relates to information handling systems, and more particularly to computer networks.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computer networks are used for many purposes, including email, web browsing, accounting, and data storage (cloud storage for example) of large amounts of data. Since these purposes vary, different networking technologies are suitable for different purposes, but in a multipurpose environment these technologies may converge. For example, Ethernet is a popular for connection to the Internet in performing web browsing, email, and other tasks, because Ethernet is inexpensive and easy to manage. However, Ethernet security is low because an unauthorized computer can be easily connected to the Ethernet cable; and Ethernet does not provide reliable message delivery to the destination because the destination may discard incoming messages in case of buffer overflow. The security and reliable message delivery have to be provided by other network layers.

In contrast, Fibre Channel (FC) networks provide better security and more reliable message delivery, and are widely used in Storage Area Networks (SANs) for data storage, e.g. at data centers providing cloud storage. FC networks have been standardized by the International Committee for Information Technology Standards (INCITS), which is accredited by American National Standards Institute (ANSI). However, FC networks are more expensive to build and operate. For example, in an FC network, the frames are forwarded based on logical addresses, called FC_ID or FCID, rather than physical (MAC) addresses as is common in Ethernet. Therefore, FC networks require logical address management. In particular, an FC switch has to receive a logical identifier called Domain ID; Domain IDs are part of every FCID of an end station port (N-port) connected to the switch, and the FC frames are forwarded from switch to switch based on the destination domain IDs. Domain IDs are generated in a discovery process in which the switches discover each other, select a principal switch, and have their Domain IDs assigned by the principal switch. This is an expensive process, requiring extensive communication via the switches' E-ports, i.e. the ports connected to inter-switch links (ISLs). When the network is extended by a new switch, additional E-port communication is needed to assign a Domain ID to the new switch. See Mark Lippitt and Erik Smith, "Network Storage Concepts and Protocols. Designing a SAN. FC SAN Concepts. IP SAN Concepts", EMC Corporation, 2014, incorporated herein by reference. In contrast, an Ethernet switch forwards frames based on the physical (MAC) addresses of end stations, and these MAC addresses are discovered by the Ethernet switch dynamically as the source addresses of the frames received by the switch. Therefore, Ethernet does not need a logical address assignment process when a new Ethernet switch is added to the network. Even if the MAC addresses are virtual (logical or non-physical), they are often easier to maintain than FCIDs or Domain IDs.

To reduce cabling and other infrastructure costs in a multi-purpose network, a network component (e.g. switch or link) may combine FC and Ethernet technologies. One industry standard defining a merger of the FC and Ethernet technologies is Fibre Channel over Ethernet, or FCoE, which uses the Ethernet medium to carry both FC and Ethernet data frames. When used for FC, the FC frames are encapsulated into Ethernet frames, and the Ethernet frames are transmitted using "lossless Ethernet" protocols which are strengthened with respect to security and reliable message delivery. Thus, a network may include FCoE segments, FC segments, and Ethernet segments. An FCoE switch has FCoE ports, and may have FC or Ethernet ports. See Mark Lippitt, Erik Smith, David Hughes, "Fibre Channel over Ethernet (FCoE). Data Center Bridging. Concepts and Protocols". EMC Corporation, 2015, incorporated herein by reference.

FCoE is similar to FC in discovery, login, Fabric controller, and other services, and in FC frame forwarding—FCoE frames are forwarded based on FCIDs. FCoE requires FCID assignments, and requires unique Domain IDs for the FC and FCoE switches. Extending an FCoE network by an additional FCoE switch still requires Domain ID assignment for the new switch.

One technique simplifying the FCID maintenance and other administrative tasks is to define virtual fabrics (vfabrics). A virtual fabric can be defined by a collection of switches' ports belonging to the fabric. A switch may have ports in different virtual fabrics, and multiple switches may have ports in the same virtual fabric. Each data flow is confined by the switches to a single virtual fabric. Each virtual fabric is managed separately to simplify management and provide traffic isolation and greater security. Each virtual fabric has its own principal switch and its own Domain IDs; a switch may have different Domain IDs in different virtual fabrics. In FCoE networks, one can define a separate virtual Ethernet LAN (VLAN) for each vfabric. An FCoE network may include Ethernet switches (e.g. pass-through switches) that ignore the FCIDs or other FC components but can still limit the FCoE traffic to a single vfabric if they limit the Ethernet traffic to the corresponding VLAN.

Obviously, combining FC with Ethernet leads to inefficiencies, and it is desirable to provide simpler, less expensive solutions for combining different types of networks.

SUMMARY

This section summarizes some features of the invention. Other features may be described in the subsequent sections. The invention is defined by the appended claims, which are incorporated into this section by reference.

Some embodiments of the present invention simplify vfabric configuration. Some embodiments avoid the Domain ID assignment process, and simplify the vfabric extension when a new FCoE switch or link is added to the network.

The invention is not limited to Ethernet or FC or FCoE. Other embodiments and variations are within the scope of the invention, as defined by the appended claims.

DETAILED DESCRIPTION OF SOME EMBODIMENTS

Before describing some embodiments of the invention, a typical computer will be described with reference to FIG. 1. This computer is an example of an information handling system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
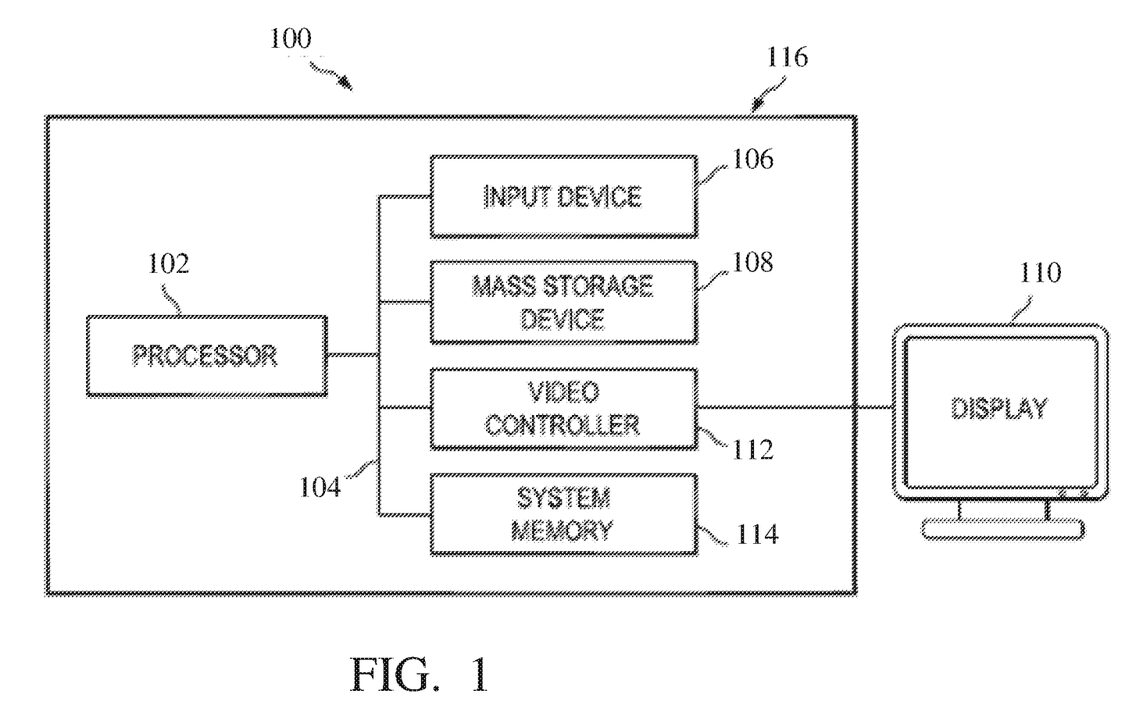
FIG. 1 is a block diagram of a computer architecture used in some embodiments of the present disclosure.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
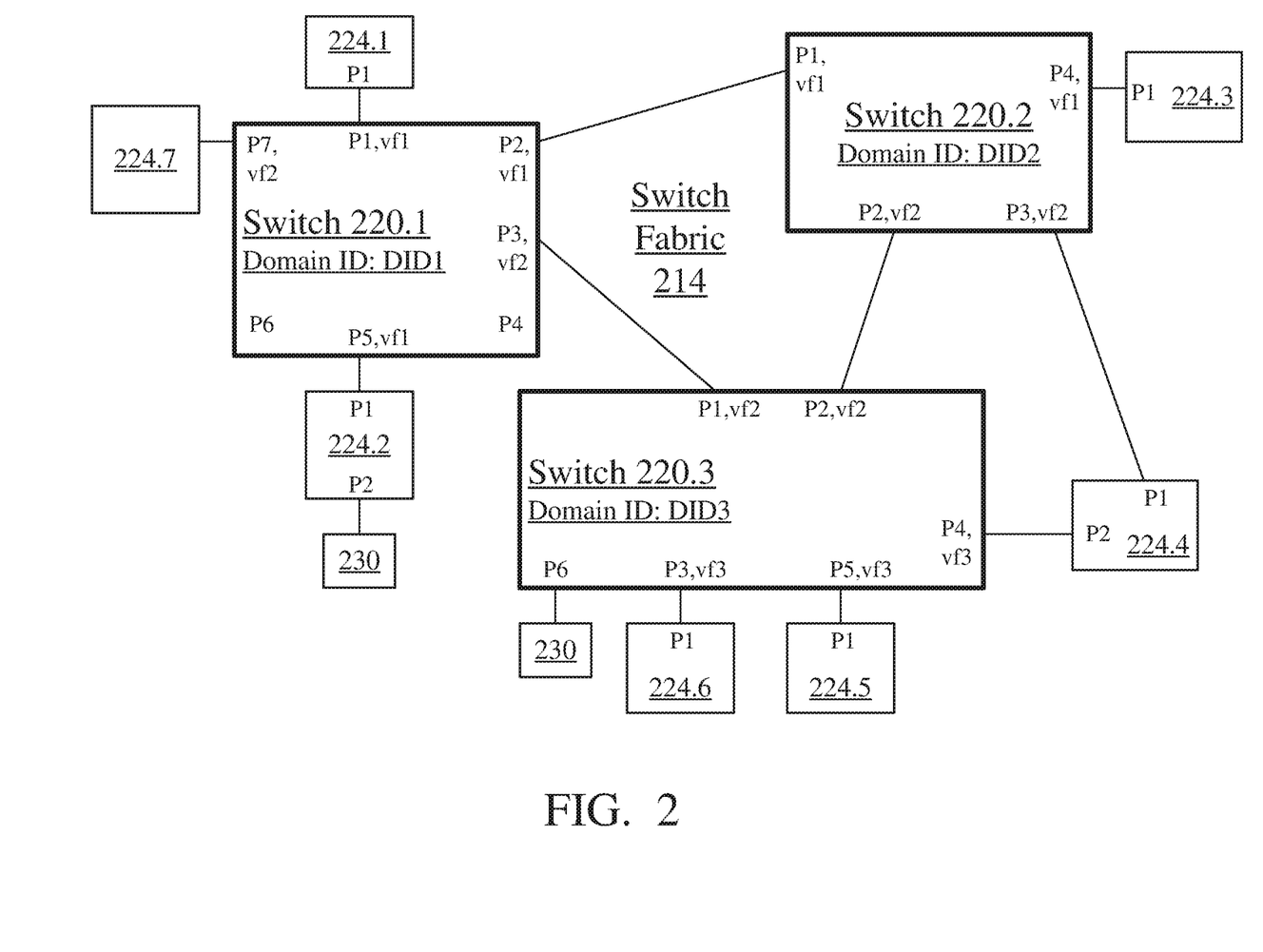
FIGS. 2, 3, 4 are block diagrams of computer networks used in some embodiments of the present disclosure.

In FC or FCoE networks, the bus 104 is replaced by a switch fabric 214 (FIG. 2), which includes one or more FC or FCoE switches 220, such as 220.1, 220.2, 220.3 in FIG. 2. As used herein, an FCoE switch is any FC switch that has at least one FCoE port and which can forward FC frames based on FCIDs. Each switch 220 may have an architecture of FIG. 1 or some other type. Switch fabric 214 interconnects network nodes 224 (224.1, 224.2, 224.3, 224.4, etc.), each of which may be as in FIG. 1 or some other type. Each node 224 can function as a host (or "initiator") or a target (storage system), or both. An initiator sends data access commands to the target, e.g. to read or write the target's storage (such as disks). The target executes the commands. The commands can be similar to SCSI (Small Computer System Interface). For example, a command can specify the target's disk sector to read or write. The data are read or written in fixed-size blocks. In a data center, initiators can be servers connected to the Internet or some other network. The targets can provide large storage, possibly suitable for a data center, e.g. for cloud storage.

Additional computers 230 communicate with the FCoE network via Ethernet or other network protocols. Computers 230 can be Ethernet switches connecting the FCoE network to Ethernet segments or other FCoE segments. Computers 230 can also be end stations used, for example, by a network administrator to configure the switch ports for virtual fabrics, or to perform other network management functions. Computers 230 and 224 can be end stations used for non-SAN functions, e.g. web browsing or accounting.

In the example of FIG. 2, switch fabric 214 includes three virtual switch fabrics, denoted respectively as vf1, vf2, vf3. For each switch port P1, P2, etc., the virtual fabric is shown next to the port. For example, ports P1 and P2 of switch 220.1 belong to vfabric vf1.

In operation, each switch 220 is assigned a domain ID. The domain IDs are shown as DID1, DID2, DID3 in FIG. 2. In conventional FC and FCoE networks, each domain ID is unique in each virtual fabric (but a switch may have different domain IDs in different vfabrics).

Each link of an FCoE network can carry both Ethernet and FCoE traffic. An FCoE frame can be an FC frame encapsulated into an Ethernet frame. A link can be an Ethernet segment, or can be a switched Ethernet network with Ethernet switches (passthrough switches, not shown). FCoE frame format used in communication between initiators and targets is shown in Table 1 below. In parentheses in Table 1, an example is given for a frame originated at node 224.1 with destination 224.3, when the frame is carried on the FCoE link from port P2 of switch 220.1 to port P1 of switch 220.2. Some frame fields are not shown.

TABLE 1

FCoE FRAME FORMAT

| Length in Bits | Content |
|---|---|
| 48 | Destination MAC address (MAC address of port P1 of switch 220.2) |
| 48 | Source MAC address (MAC address of port P2 of switch 220.1) |
| ... | ... |
| 32 | SOF—Start of Frame, indicating the start of encapsulated FC frame |
| ... | ... |
| 24 | Destination FCID (FCID of Port P1 of node 224.3) |
| ... | ... |
| 24 | Source FCID (FCID of Port P1 of node 224.1) |
| ... | ... |
| ... | FC Payload |
| ... | ... |

Table 2 below shows FCID format, such as used for the Destination FCID and Source FCID fields in Table 1:

TABLE 2

FCID FORMAT

| Length in Bits | Content |
|---|---|
| 8 | Domain ID (DID2 for FCID of node 224.3; DID1 for nodes 224.2 or 224.7) |
| 8 | Area ID |
| 8 | Port ID |

The Area ID and Port ID together identify a node 224 port connected to the switch identified by the Domain ID.

A port of a switch 220 or node 224 can be a port-channel, i.e. a logical port corresponding to multiple physical ports. A port-channel of a node 224 has a single FCID and a single logical MAC address. Each frame transmitted or received on a port-channel is actually transmitted or received on a single physical port. Multiple physical ports can transmit or receive respective different Ethernet frames in parallel, like in a link aggregation group (LAG).

Figure 3:
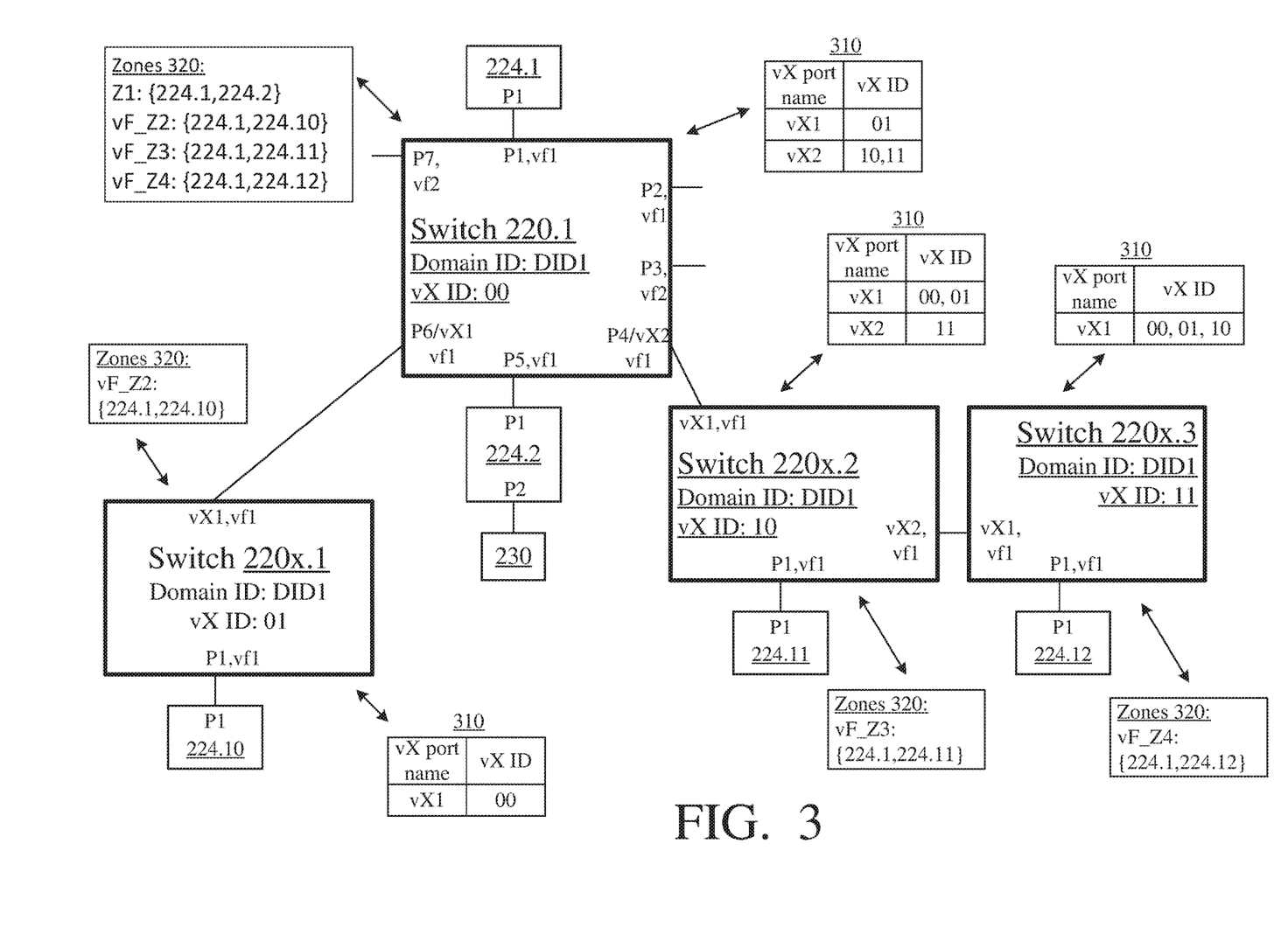

In switch 220.1, ports P4 and P6 are unused, and can be used to connect other switches to extend the switch fabric. In the example of FIG. 3, additional switches 220x (220x.1, 220x.2, 220x.3) are connected to extend the virtual fabric vf1. In other embodiments, multiple virtual fabrics can be extended. The additional switches 220x may include ports of other virtual fabrics.

In virtual fabric vf1, all the additional switches 220x have domain ID of DID1, same as for switch 220.1. (Domain IDs can also be different for different switches in vfabric vf1 as explained below.) The additional switches 220x may have other domain IDs in other virtual fabrics.

The network of FIG. 3 may include the same components as in FIG. 2, and in particular may include switches 220.2 and 220.3 and nodes 224 connected as in FIG. 2. Some of these components are omitted for simplicity.

In switches 220x, the switch ports connected to other switches are named vX1, vX2, etc. for convenience of description. For example, ports P4 and P6 of switch 220.1 are named as vX2 and vX1 respectively. The invention is not limited to any particular port names. Also, the switches 220.1, 220x may or may not be fully functional FCoE switches. For example, the vX ports do not need the E-port functionality in some embodiments because these ports do not execute domain ID assignment protocols.

In vfabric vf1, each switch 220.1, 220x can be thought of as part of an extension of virtual fabric vf1. The switches 220.1, 220x are not identified by the Domain ID because they have the same Domain ID (DID1). Each switch is identified by vfabric extension identifier vX ID. Since there are four switches, vX ID can be two bits. In the example of FIG. 3, the vX IDs for switches 220.1, 220x.1, 220x.2, 220x.3 are respectively as 00 (binary), 01, 10, 11. The vx IDs can be assigned by a network administrator or by software for example.

In some embodiments, vX ID is encoded in FCID of each node 224 connected to the extended vfabric. For example, vx ID can be encoded in two bits in predetermined bit positions in FCID. Suppose, for example, that vX ID is encoded in the two most significant bits of Area ID (see Table 2), and let us assume that DID1=10 (decimal), i.e. 1010 (binary). Then the FCIDs may be as follows:

TABLE 3

FCIDs OF SOME PORTS

| Port | Domain ID (binary) | Area ID (binary) | Port ID (binary) |
|---|---|---|---|
| P1 of 224.1 | 00001010 | 00000000 (vX ID = 00) | 00000000 |
| P1 of 224.2 | 00001010 | 00000001 (vX ID = 00) | 00000000 |
| P1 of 224.10 | 00001010 | 01000000 (vX ID = 01) | 00000000 |

In some embodiments, vX ID is encoded in some other bit positions, for example, in Port ID or Domain ID. If Domain ID is used, then the Domain IDs will be different for different switches within the vfabric extension switches 220x. If the vfabric includes ports of other switches, such as 220.2 in FIG. 2, then the Domain IDs of the vfabric extension switches are made unique, by a network administrator for example.

In some embodiments, each switch 220 stores a profile for each of its ports in the switch's memory, as is common in FC and FCoE networks. The switch also stores in its memory, the identifier and the switch's port names of each virtual fabric which includes the switch's port or ports. For the vX ports, the profile indicates that the port is a vX type, i.e. vfabric extension type, connected to another switch in the vfabric extension. The switch also stores the port's vX ID. The switch will not run domain ID assignment protocols on the vX ports. The vfabric may also include E-ports, such as port P2 of switch 220.1, on which the switch may run the Domain ID assignment protocol to assign a Domain ID to switch 220.1.

In some embodiments, the switches use the Fabric Shortest Path First (FSPF) routing protocol to discover each other and create their forwarding tables, as is common in FC or FCoE networks. Other routing protocols can also be used in some embodiments of the present disclosure. A loop prevention protocol can be run in the vfabric extension switches to eliminate loops. Such protocols are well known. The FCoE data forwarding can be modified to allow forwarding based on the vX ID bits of FCID. For example, FIG. 3 shows forwarding table entries 310 for each vX port; these tables indicate reachability of other vfabric extension switches 220.1, 220x from that port. For example, table 310 for switch 220.1 indicates that the switch's port vX1 can be used to reach vX ID 01 (i.e. switch 220x.1), and port vX2 can be used to reach vX IDs 10 (switch 220x.2) and 11 (switch 220x.3).

To forward an incoming frame, switch 220.1 checks the destination FCID of an incoming frame, and if the domain ID is DID1, then the switch determines the destination vX ID from the FCID bits, and determines the outgoing port from table 310.

For switch 220x.3, table 310 specifies that all the other extension switches 220.1, 220x are reachable through port vX1.

For switch 220x.1, table 310 specifies only the switch 220.1 as reachable through port vX1. While the other extension switches are also physically reachable, they are logically blocked, i.e. unreachable, by table 310. In other embodiments, all the extension switches are reachable, and table 310 of switch 220x.1 specifies vX IDs 00, 10, 11 for port vX1.

In some embodiments, in each node 224, each port connected to a vfabric extension switch is configured to operate as an N-port, but can also be configured to operate as a virtualized N-port for NPV (N-Port Virtualization) or NPIV (N-Port ID Virtualization). In virtualization modes, the port can be associated with different World-Wide Names (WWNs) to either connect different devices to the switch port or to function as if representing different devices. Likewise, in each vfabric extension switch 220.1, 220x, each port connected to a node 224 can operate in F-port mode or in NPV or NPIV mode.

The extended vfabric vf1 provides the usual FCoE services such as Login (FLOGI, PLOGI, PRLI), Directory service, Fabric controller service, and other services. In particular, each node 224 obtains its FCID from the vfabric in response to fabric login (FLOGI). A vX port may or may not be a logical port, e.g. an Ethernet port-channel.

The extended fabric's switches run the FCoE Initialization Protocol (FIP), except that there is no Domain ID assignment on the vX ports. In some embodiments, for the vX ports, each switch periodically transmits a port descriptor frame specifying that the port is of type vX, and providing the port's vX ID and the list of vX IDs reachable from the port (as in the switch's table 310).

In some embodiments, the extended vfabric supports zoning, and zones may include vX ports. As is known, a zone limits connectivity within a switch fabric or vfabric, by defining entities that are members of the zone, i.e. are allowed to communicate with each other. The entities can be nodes 224 and/or their ports and/or switches' ports including possibly vX ports, and/or other using types. If a node 224 changes state—e.g. goes down, logs out, or changes its name, or a new node 224 is added, or a target's storage is reconfigured, etc.—the affected switch 220 will notify the nodes 224 of the change via Registered State Change Notifications, or RSCNs. The RSCNs are sent only to nodes in the affected zone but not to other nodes. As shown at 320, each switch 220 specifies, in its memory, each zone associated with the switch: for each zone, the switch 220 identifies, in its memory, each entity belonging to the zone; the entity can be, for example, the switch's port, or the node 224 or its port, etc. Using the data 320, the switch can send RSCNs to all other nodes 224 affected by a change in the zone associated with the switch.

As illustrated at 320, there are four zones: Z1, vF_Z2, vF_Z3, vF_Z4. Zone Z1 includes only nodes connected to a single switch (nodes 224.1 and 224.2 connected to switch 220.1). Each of the other three zones, vF_Z2, vF_Z3, and vF_Z4, has nodes 224 connected to different switches. Such zones are called "special" herein. In one example, node 224.1 is an initiator, and the nodes 224.2, 224.10, 224.11, 224.12 are targets. This example is not limiting.

The zones can be defined in a usual way, by a network administrator for example. If a zone is a special zone and is defined at any switch, the other switches associated with the zone can be informed via FIP. In particular, the other switches can be provided, via FIP, with the pertinent name server details (e.g. FCIDs) of the members of the zone.

In some embodiments, each virtual fabric, e.g. vf1, is associated with an Ethernet VLAN. The vfabric extensions are placed in the same VLAN.

Figure 4:
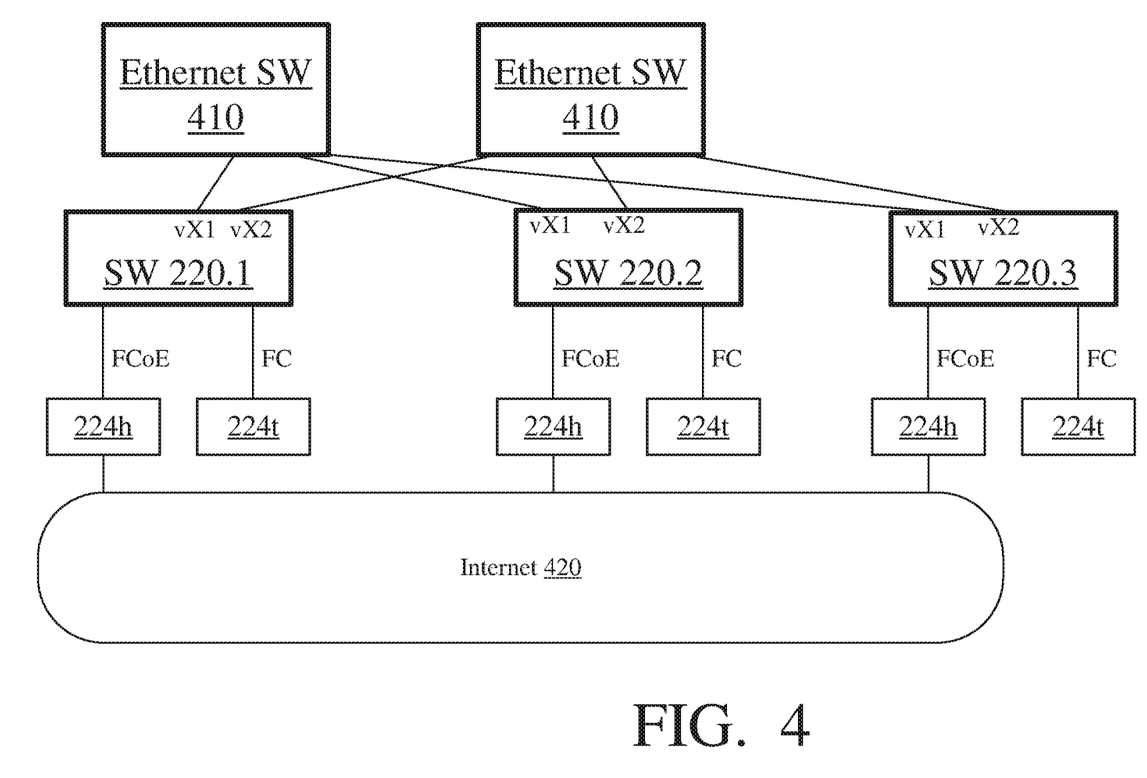

Vfabric extensions can be provided using inexpensive switches that do not have full E-port functionality or FSPF capability. Network scalability is improved as a result. FIG. 4 shows one example of such an extension. This is a spine/leaf network. Spine/leaf networks are described, for example, in "Dell EMC Networking FCoE-to-Fibre Channel Deployment with 54148U-ON in F_port Mode", Dell EMC Networking Infrastructure Solutions, Dell, Inc, June 2018, incorporated herein by reference. In FIG. 4, FCoE switches 220.1, 220.2, 220.3 are leaves in the spine/leaf network. Each switch 220 has vX ports vX1 and vX2 connected, by respective Ethernet links, to respective Ethernet spine switches 410.1 and 410.2. In addition, each leaf 220 is connected to one or more initiator servers 224h via FCoE links, and/or to one or more targets 224t via FC links. Servers 224h are also connected to the Internet or some other network 420, possibly via Ethernet links and a gateway router (not shown).

The spine 410 serves as an Ethernet bridge interconnecting the leaves 220. The spine switches forward Ethernet and FCoE traffic based on MAC addresses, ignoring the FCIDs in the FCoE frames. An FCoE frame transmitted by a leaf 220 on a port vX1 or vX2 has the source MAC address set to the MAC address of the transmitting port vX1 or vX2; the destination MAC address set to MAC address of the port vX1 or vX2 of the destination leaf 220; and source and destination FCIDs set to the FCIDs of the source and target ports on nodes 224.

Virtual fabrics can be defined to include vX ports and other ports. A vfabric may have no E-ports. For example, a vfabric may include the ports vX1 on leaves 220.1 and 220.2, and ports connected to nodes 224, using the techniques of FIG. 3. In some embodiments, all the switches 220 of FIG. 4 have the same Domain ID in each vfabric.

In some embodiments, each vfabric corresponds to an Ethernet VLAN including the vfabric's FCoE ports and also including those ports of switches 410 that can carry the vfabric's traffic. New leaf and/or spine switches can be added to the network when needed, and the vfabrics can be extended to include ports of the additional leaf switches. In some embodiments, the switches 220 do not have full E-port functionality. The system cost can therefore be reduced.

Some embodiments of the invention are defined by the following clauses.

Clause 1 defines a method comprising data transfer between computer nodes (e.g. 224) in a computer network comprising a plurality of switches (e.g. 220) and a virtual switch fabric (e.g. vf1) comprising a plurality of switch ports which are ports of said switches and which are interconnected by one or more communication links, at least two switch ports belonging to respective different switches of the plurality of switches, wherein each switch is operable to forward first data units (e.g. FC frames) sent by the computer nodes whose ports are connected to the switches, the ports of the computed nodes operating according to a first protocol (e.g. FC) in which each port of the computer nodes is identified by a first address comprising a domain ID portion for carrying a logical address identifying a switch to which the port is connected;

wherein each communication link is operable to carry second data units (e.g. Ethernet frames) according to a second protocol, with each second data unit comprising a second address (e.g. MAC address) identifying an end of the communication link;

wherein each communication link is operable to carry first data units encapsulated into second data units;

wherein for at least one first data unit sent from a computer node's port connected to a first switch port of the virtual switch fabric to a computer node's port connected to a second switch port of the virtual switch fabric, at least one switch forwards the at least one first data unit based on a virtual fabric extension ID of the at least one first data unit's first address and not based on the domain ID portion of the at least one first data unit's first address, the virtual fabric extension ID not comprising the domain ID portion.

2. The method of clause 1, wherein in the first address of the at least one first data unit, the domain ID portion does not identify a switch.

3. The method of clause 1 or 2, wherein virtual fabric extension ID has fewer bits than the domain ID.

4. The method of any preceding clause, wherein within the virtual fabric, a plurality of switches have the same domain ID.

5. The method of any preceding clause, wherein the first data units are formed according to Fibre Channel (FC) protocol, and the second data units are formed according to Ethernet protocol.

6. The method of any preceding clause, wherein the first data units are formed according to a point-to-point protocol, and the second data units are formed according to a point-to-multipoint protocol. For example, FC is a point-to-point protocol. In contrast, Ethernet is a point-to-multipoint protocol.

7. The method of any preceding clause wherein at least one communication link is a wireless link. In particular, an FC or FCoE link can be wired or wireless.

8. The method of any preceding clause wherein at least one communication link comprises a passthrough switch (e.g. 410) forwarding second data units according to the second addresses but not the first addresses.

9. The method of any preceding clause wherein at least one said computer node is connected to at least one said switch by a communication link (e.g. FC link between a node 224*t* and a switch 220.1 in FIG. 4) which is for carrying first data units not encapsulated into second data units, the switch being operable to encapsulate the first data units into second data units for transmission within the virtual fabric.

10. The method of any preceding clause wherein at least one said computer node is connected to at least one said switch by a communication link (e.g. FC link between a node 224*t* and a switch 220.1 in FIG. 4) which is for carrying data comprising no addresses other than the first destination addresses. For example, FC links can transmit FC frames without appending the Ethernet addresses or any other addresses than the FCIDs.

Some embodiments include switches or computer nodes operating according to methods described above. Some embodiments include computer readable media comprising computer instructions causing the switches or the computer nodes to perform the methods described above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel communication switch fabric, comprising: a plurality of switches that are each configured to forward Fibre Channel communications based on Fibre Channel identifiers included in the Fibre Channel communications; and a virtual switch fabric, wherein a first switch in the plurality of switches is assigned, using a domain identifier assignment protocol, a first domain identifier in the virtual switch fabric for use in forwarding Fibre Channel communications in the virtual switch fabric, wherein a second switch in the plurality of switches is assigned, using the domain identifier assignment protocol, a second domain identifier in the virtual switch fabric for use in forwarding Fibre Channel communications in the virtual switch fabric, wherein the virtual switch fabric is configured to be extended to a third switch in the plurality of switches that is connected to the first switch device after having not previously participated in the virtual switch fabric and not previously being assigned a domain identifier in the virtual switch fabric, via a virtual fabric extension process that assigns an extension identifier associated with the virtual switch fabric to the third switch, and wherein the first switch device is configured to: receive a first Fibre Channel communication; and determine whether a destination domain identifier in a destination Fibre Channel identifier in the first Fibre Channel communication is a domain identifier associated with the virtual switch fabric and: if the destination domain identifier is not the domain identifier associated with the virtual switch fabric, forward the first Fibre Channel communication to the second switch having the domain identifier identified by the destination domain identifier; and if the destination domain identifier is the domain identifier associated with the virtual switch fabric, forward the first Fibre Channel communication to the third switch having the extension identifier that is included in the destination Fibre Channel identifier in the first Fibre Channel communication.

2. The switch fabric of claim 1, wherein the first FC communication is a Fibre Channel over Ethernet communication.

3. The first switch fabric of claim 1, wherein the domain identifier assignment protocol includes at least one of:
   a Fibre Channel domain identifier assignment protocol or
   a Fibre Channel over Ethernet domain identifier assignment protocol.

4. The switch fabric of claim 1, wherein the first switch is configured to not execute the domain identifier assignment protocol as part of the virtual fabric extension process on a port to which the third switch device is connected.

5. The switch fabric of claim 4, wherein the port is configurable as a Fibre Channel port.

6. The switch fabric of claim 4, wherein the port is configurable as an Fiber Channel over Ethernet port.

7. The switch fabric of claim 1, wherein the first switch and the third switch are configured as part of the same zone.

8. The switch fabric of claim 1, wherein the virtual fabric extension process is performed in response to the third switch being connected to the first switch.

9. The switch fabric of claim 1, wherein the extension identifier is a predefined field in the destination Fibre Channel identifier.

10. The switch fabric of claim 9, wherein the extension identifier includes at least one bit outside a domain identifier in the destination Fibre Channel identifier.

11. The switch fabric of claim 1, wherein the extension identifier includes at least one bit outside domain identifier in the destination Fibre Channel identifier.

12. The switch fabric of claim 1, wherein the extension identifier is part of an area identifier in the destination Fibre Channel identifier.

13. The switch fabric of claim 1, wherein at least one port on the first switch is configured to forward Fiber Channel over Ethernet communications.

14. A Fibre Channel communication switch fabric, comprising: one or more switches interconnecting computer nodes, wherein each of the one or more switches is configured to forward the Fibre Channel communications based on Fibre Channel identifiers in the Fibre Channel communications; and a virtual switch fabrics, wherein a first switch included in the one or more switches is assigned, as part of a first Domain ID assignment protocol, a domain identifier in the virtual switch fabric in which the first switch is configured to forward Fibre Channel communications, wherein the virtual switch fabric is extendible, as part of a virtual switch fabric extension process for a second switch that is newly connected to a first port the first switch to extend the virtual switch fabric and that did not previously participate in the virtual switch fabric and did not previously have a domain identifier in the virtual switch fabric, and wherein the virtual switch fabric extension process assigns the domain identifier of the first switch to the second switch.

15. The switch fabric of claim 14, further comprising:
a passthrough switch that is included in the one or more switches and that is configured to forward the Fibre Channel communications without using Fibre Channel identifiers.

16. The switch fabric of claim 15, wherein the passthrough switch is configured to forward Fibre Channel over Ethernet communications that are based on Ethernet protocol.

17. The switch fabric of claim 14, wherein the Fibre Channel communications are Fibre Channel over Ethernet communications.

18. The method of claim 14, wherein the domain identifier assignment protocol includes at least one of:
a Fibre Channel domain identifier assignment protocol, or
a Fibre Channel over Ethernet (FCoE) domain identifier assignment protocol.

19. A method for extending a Fibre Channel switch fabric comprising: forwarding, by a plurality of switches in a switch fabric, Fibre Channel communications based on Fibre Channel identifiers included in the Fibre Channel communications; assigning, to a first switch provided by the plurality of switches using a domain identifier assignment protocol, a first domain identifier in a virtual switch fabric included in the switch fabric for use in forwarding Fibre Channel communications in the virtual switch fabric; assigning, to a second switch provided by the plurality of switches using the domain identifier assignment protocol, a second domain identifier in the virtual switch fabric for use in forwarding Fibre Channel communications in the virtual switch fabric; extending, to a third switch in the plurality of switches that is connected to the first switch device after having not previously participated in the virtual switch fabric and not previously being assigned a domain identifier in the virtual switch fabric as part of a virtual fabric extension process, an extension identifier associated with the virtual switch fabric to the third switch; receiving, by the first switch, a first Fibre Channel communication; determining, by the first switch, whether a destination domain identifier in a destination Fibre Channel identifier in the first Fibre Channel communication is a domain identifier associated with the virtual switch fabric and: if the destination domain identifier is not the domain identifier associated with the virtual switch fabric, forwarding the first Fibre Channel communication to the second switch having the domain identifier identified by the destination domain identifier; and if the destination domain identifier is the domain identifier associated with the virtual switch fabric, forwarding the first Fibre Channel communication to the third switch having the extension identifier that is included in the destination Fibre Channel identifier in the first Fibre Channel.

20. The method of claim 19, wherein the first domain identifier is assigned to both the first switch and the third switch.

* * * * *

UNITED STATES PATENT AND TRADEMARK OFFICE
CERTIFICATE OF CORRECTION

PATENT NO. : 11,671,381 B2
APPLICATION NO. : 17/170084
DATED : June 6, 2023
INVENTOR(S) : Subbiah et al.

Page 1 of 1

It is certified that error appears in the above-identified patent and that said Letters Patent is hereby corrected as shown below:

In the Specification

Column 8, Line 14:
"54148U-ON"
Should read:
--S4148U-ON--

In the Claims

Claim 3, Column 10, Line 44, should read as follows:
--The switch fabric of claim 1, wherein the domain--

Claim 11, Column 11, Line 2:
"outside domain identifier"
Should read:
--outside a domain identifier--

Claim 14, Column 11, Line 15:
"a virtual switch fabrics"
Should read:
--a virtual switch fabric--

Claim 14, Column 11, Line 22, should read as follows:
--that is newly connected to a first port on the first switch to--

Claim 19, Column 12, Line 37, should read as follows:
--Channel identifier in the first Fibre Channel communication.--

Signed and Sealed this
Fifteenth Day of August, 2023

Katherine Kelly Vidal
*Director of the United States Patent and Trademark Office*